United States Patent [19]

Ten Eyck

[11] Patent Number: 4,999,168
[45] Date of Patent: Mar. 12, 1991

[54] CRACK RESISTANT INTUMESCENT SHEET MATERIAL

[75] Inventor: John D. Ten Eyck, Lewiston, N.Y.

[73] Assignee: The Carborundum Company, Cleveland, Ohio

[21] Appl. No.: 345,756

[22] Filed: May 1, 1989

[51] Int. Cl.⁵ .................. B01D 50/00; B01D 53/36; F01N 3/10
[52] U.S. Cl. .................................. 422/179; 422/180; 422/221; 422/222; 55/DIG. 3; 60/299
[58] Field of Search ............... 422/179, 180, 221, 222; 55/DIG. 30; 60/299

[56] References Cited

U.S. PATENT DOCUMENTS

| | | | |
|---|---|---|---|
| 3,227,241 | 1/1966 | Mattoon | 181/56 |
| 3,798,006 | 3/1974 | Balluff | 422/179 |
| 3,876,384 | 4/1975 | Santiago et al. | 23/288 |
| 3,891,396 | 6/1975 | Musall et al. | 23/288 |
| 3,916,057 | 10/1975 | Hatch et al. | 422/179 X |
| 4,048,363 | 9/1977 | Langer et al. | 428/77 |
| 4,142,864 | 3/1979 | Rosynsky et al. | 422/179 |
| 4,239,733 | 12/1980 | Foster et al. | 422/179 |
| 4,256,700 | 3/1981 | Smith et al. | 422/177 |
| 4,269,807 | 5/1981 | Bailey et al. | 422/179 |
| 4,328,187 | 5/1982 | Musall et al. | 422/179 |
| 4,353,872 | 10/1982 | Midorikawa | 422/179 |
| 4,385,135 | 5/1983 | Langer et al. | 422/179 X |
| 4,425,304 | 1/1984 | Kawata et al. | 422/171 |
| 4,629,605 | 12/1986 | Santiago | 422/179 |

Primary Examiner—Robert J. Warden
Assistant Examiner—Lynn M. Kunnert
Attorney, Agent, or Firm—George W. Moxon, II; Joseph G. Curatolo; Larry W. Evans

[57] ABSTRACT

A handleable, flexible, crack resistant intumescent sheet material for use in mounting fragile structures comprising a preformed intumescent layer, and a reinforcing layer bonded to the intumescent layer and having a tensile strength greater that the intumescent layer.

11 Claims, 1 Drawing Sheet

CRACK RESISTANT INTUMESCENT SHEET MATERIAL

The present invention relates to a sheet material for use in mounting fragile monolithic structures used to treat exhaust gases. More specifically, the present invention relates to a sheet material used to mount and support the frangible monolith on which the catalytic material is deposited for interaction with the exhaust gases.

BACKGROUND OF THE INVENTION

Such monoliths may be formed of a brittle fireproof ceramic material such as aluminum oxide, silicon dioxide, magnesium oxide, zirconia, cordierite, silicon carbide and the like. These ceramic materials provide a skeleton type of structure with a plurality of tiny flow channels. Small shockloads are sufficient to crack or crush the monolith. Due to this brittleness problem which exists when using this type of catalytic device in connection with motor vehicles in which the ceramic monolith is located in a housing connected to the exhaust gas system, much effort has been expended in developing means for support of the monolith in its housing so that the monolith would be immune to or unaffected by shockloads. Representative of these efforts are discussed:

U.S. Pat. No. 3,798,006 discloses securement of a monolith type catalyst element in its housing by a differentially hardened fibrous lining. The monolith is supported by a felted layer or sleeve of ceramic fibers which are compressed between the monolith and a shell.

U.S. Pat. No. 3,876,384 discloses a monolithic catalyst carrier body which is resiliently mounted in a reactor casing by surrounding the monolith with a protective jacket which includes highly heat-resistant steel reinforcing means embedded in ceramic fiber and binder means.

U.S. Pat. No. 3,891,396 discloses an elastic holder for monolithic catalyst bodies. The holder consists of a metallic corrugated tube which simultaneously forms the outer wall of the exhaust conduit and which is provided with a mechanical bias which safely holds the monolithic catalyst body and presses it against an end bearing.

U.S. Pat. No. 3,916,057 discloses a process for mounting monolithic catalyst support elements which utilizes an intumescent sheet material containing vermiculite or other expandable mica. The intumescent sheet material functions as a resilient mounting material by expansion in situ. The thermal stability and resilience of the sheet after exfoliation compensate for the difference in thermal expansion of the metal canister and the monolith and absorbs mechanical vibrations transmitted to the fragile monolith or forces which would otherwise be imposed on the monolith due to irregularities in the metallic or ceramic surfaces. The sheet material is preferably made by conventional paper making techniques, although coating or extruding on a sheet of Kraft paper, polyethylene terephthalate fiber, or glass mat or fabric is disclosed. But, the patent notes that the principal disadvantages of coating a ceramic directly is controlling the thickness of the dry coating.

U.S. Pat. No. 4,048,363 discloses a laminated intumescent mounting mat using an offset of the adhesively joined layers for use in wrapping a ceramic catalytic monolith. The adhesive on the offset is covered with a release layer which is removed after wrapping to join the ends together. After heating, expansion of the intumescent material in the mat secures the monolith in its housing or covering.

U.S. Pat. No. 4,142,864 discloses mounting of a catalytic ceramic monolith by positioning a resilient, flexible ceramic fiber mat or blanket in the space between the catalytic monolith and the inner surface of the casing. This blanket is compressed upon installation of annular plug members which are inserted at each end of the ceramic monolith between it and the casing. The plugs may be formed of solid metal, wire mesh or hollow metal.

U.S. Pat. Nos. 4,239,733 and 4,256,700 disclose a catalyst coated ceramic monolith supported in a sheet metal housing by both a wire mesh sleeve and an intumescent sleeve which are positioned adjacent each other in non-overlapping fashion.

U.S. Pat. No. 4,269,807 discloses a resilient mounting for a ceramic catalytic monolith in which the monolith is surrounded with a blanket of knitted wire mesh which is partially compressed throughout its length. Overlying the knitted wire mesh is a band of high-temperature intumescent material containing ceramic fiber as a viscous caulking or paste within the matrix of the metal mesh. In one of the constructions disclosed the ceramic monolith is coated with ceramic fibers followed by surrounding it with a blanket of knitted wire mesh.

U.S. Pat. No. 4,305,992 discloses flexible intumescent sheet materials containing unexpanded ammonium ion-exchanged vermiculite flakes and suitable for use in mounting automotive catalytic converter monoliths.

U.S. Pat. No. 4,328,187 discloses an elastic holder for axial suspension of a ceramic catalytic monolith within a housing. The monolith is surrounded with a layer of heat-resistant mineral fiber material, over which lies a jacket or sleeve of good heat-insulating mineral material, and a layer made from a highly-elastic material such as foam, asbestos or glass fiber fleece, or from a metallic wire mesh. The layers provide a cushion which serves as a damping element extending within the housing over the entire length of the monolith and elastically suspending the monolith together with its ceramic fiber wrapping and sleeve against the walls of the housing.

U.S. Pat. No. 4,335,077 discloses support of a ceramic catalytic monolith by means of elastically deformable damping rings or envelopes, where the monolith is surrounded by a protective jacket of heat-resistant cement or putty reinforced with ceramic fibers or metal in the form of a wire mesh or the like. The protective jacket is enveloped around its circumference by a soft mineral fiber layer which is compressed between the housing wall and the protective jacket.

U.S. Pat. No. 4,353,872 discloses support of a ceramic catalytic monolith within its casing by means of a gas seal member formed of heat-resistant and expandable sheet material, for example, vermiculite, quartz or asbestos, which envelopes a portion of the monolith, including a separate layer of generally cylindrically knitted wire or resilient support disposed between the monolith and its casing to dampen external forces applied to the monolith.

U.S. Pat. No. 4,425,304 discloses a catalytic converter in which ceramic catalytic monoliths are supported by an elastic pad of expanded metal or steel mesh fabrics or a knitted web of ceramic fibers at their ends and are wrapped with respective cushioning layers of expanded metal or any other known flame-retardant, corrosion-resistant cushioning material.

U.S. Pat. No. 4,432,943 discloses an elastic suspension for a monolithic catalyst body in which the annular space between the housing and the catalyst body is filled with heat-resistant mineral fiber material which serves to prevent bypass of exhaust gas and as thermal insulation, and a construction where the monolith is surrounded by a mineral fiber layer and a rigid sleeve of heat-resistant metal positioned over the mineral fiber layer. The annular space between the sleeve and the housing may be filled with ceramic fiber.

In spite of the large variety of support materials available, a typical passenger automobile catalytic converter which utilizes a ceramic monolith will be supported by intumescent sheet material like that described in U.S. Pat. No. 3,916,057 or 4,305,992, having, e.g., a nominal thickness of 0.195 inch and a nominal density of 40 pcf. This material is bent to conform to the monolith and compressed during installation of the ceramic monolith into its metallic shell in which it may have a nominal thickness of 0.130 inch and a nominal density of about 60 pounds per cubic foot (pcf). To withstand the higher operating temperatures often encountered in the operating cycle of a higher gross vehicle weight (GVW) vehicle such as a truck, the overall nominal thickness of the compressed installed intumescent layer may be increased to about 0.24 inch and the nominal density may be increased to about 65-70 pounds per cubic foot as installed.

As intumescent sheet materials are bent around the monolith, a tensile stress is exerted on the outer most intumescent layer, if there are several layers, or the outer surface if there is a single layer, which can result in tearing of the surface or flaking of the vermiculite in the intumescent layer. When this happens, the sheet materials may not be useful and closure problems can result if the flakes find their way to the flanges which are used to close the outer metal casing. As can be appreciated, the thicker intumescent materials can aggravate the situation, as can the fact that the sheet materials are put under tension.

Thus, there is a need for intumescent sheet materials which minimize installation problems while providing a satisfactory mount for fragile structures, such as monolithic catalytic converters.

BRIEF SUMMARY OF THE INVENTION

The primary purpose of this invention is to provide an improved mounting for frangible ceramic monoliths which is suitable and very convenient for mass manufacture and for use in the exhaust systems of internal combustion engines.

According to the present invention, this purpose is accomplished by a handleable, flexible, crack resistant, resilient, composite intumescent sheet material comprising at least one preformed intumescent layer which is subsequently bonded to a reinforcing layer having a tensile strength greater than said intumescent layer. The sheet material can further include a ceramic fiber layer for mounting in contact with the ceramic monolith, such as a catalytic converter.

The sheet material can have a composite thickness of about 0.1 inch to about 5 inches. The reinforcing layer can be Kraft paper, plastic film or inorganic fiber fabric, although polypropylene film having a thickness of up to 3 mils is preferred. What is important is that the reinforcing layer is bonded to the intumescent layer by a bonding mean which is flexible and has a bond strength greater than the shear forces encountered in bending the sheet material. This will allow the reinforcing layer to restrain preferentially to the intumescent layer cracking as the composite sheet material is bent around the catalytic converter in the installation process. The reinforcing layer also contains the vermiculite in the intumescent layer and minimizes its getting into the flange.

Yet another benefit is that the reinforcing layer provides a constraint on the intumescent layers and minimizes it extruding into the joint. Thus, the sheet material of the present invention is very convenient for mass manufacture in mounting fragile structures.

DETAILED DESCRIPTION OF THE INVENTION

Figure 1:
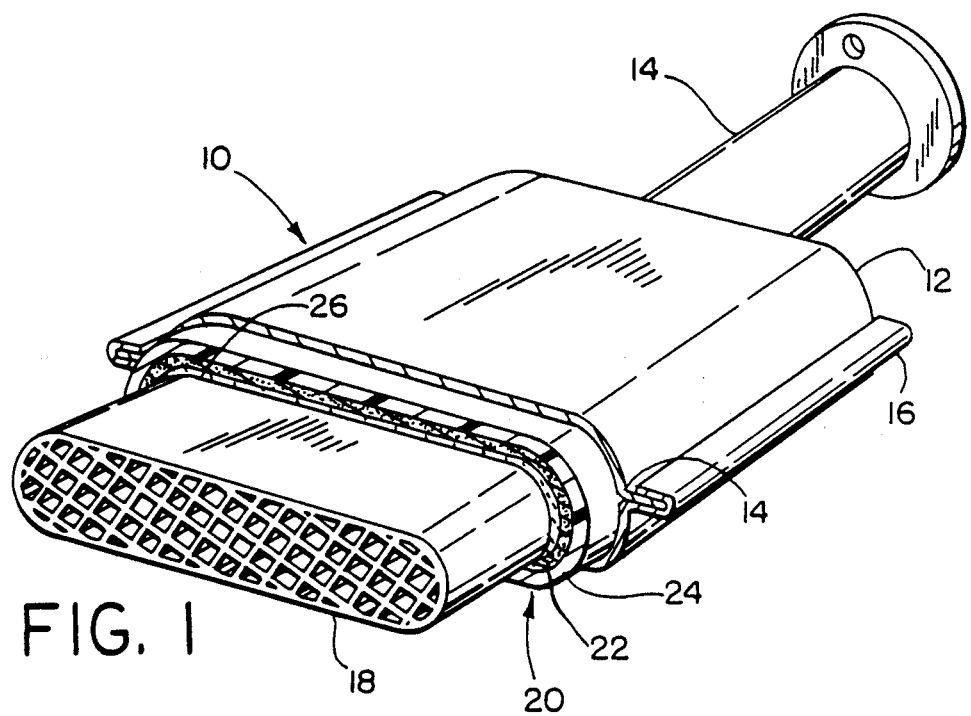
FIG. 1 is a fragmentary isometric view of a device embodying the invention.

Referring to the figures, there is shown at numeral 10 a catalytic converter generally. The present invention is not intended to be limited to use in the catalytic converter shown, and so is shown only as an example to illustrate the invention. In fact, the sheet material could be used to mount any fragile structure, such as a diesel particulate trap or the like. The term fragile as structure is intended to mean and include structures such as ceramic or metal monoliths or the like which are fragile or frangible in nature and would benefit from a sheet material or mounting pad such as is described herein.

Catalytic converter 10 includes a generally tubular housing 12 formed of two pieces of metal, e.g. high temperature-resistant steel. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile structure, such as a frangible ceramic monolith 18 which is supported and restrained within housing 12 by intumescent sheet material 20 to be further described. Monolith 18 includes a plurality of gas-pervious passages which extend axially from its inlet end face at one end to its outlet end face at its opposite end. Monolith 18 is constructed of a suitable refractory or ceramic material in known manner and configuration. Monoliths are typically oval or round in cross-sectional configuration, but other shapes are possible.

Figure 2:
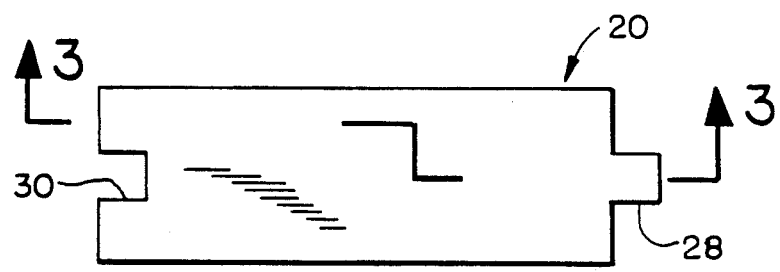
FIG. 2 is a plan view of an intumescent sheet material embodying the invention.

In accordance with the present invention, the monolith is spaced from its housing by a distance which can be at least about 0.05 inch, and can be up to one inch or more. This space is filled with an intumescent mounting sheet material 20 found in FIGS. 2 and 3 to support the ceramic monolith 18.

Figure 3:
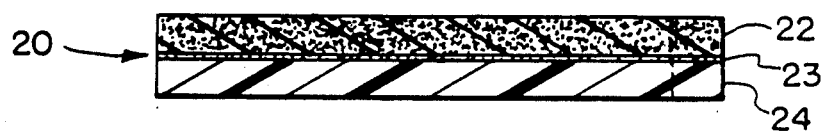
FIG. 3 is a cross section of FIG. 2 along lines 3—3.

As shown in FIGS. 1 and 3, the sheet material 20 includes a preformed intumescent layer 22 which has a substantially uniform thickness and which is subsequently adhesively bonded to a reinforcing layer 24. In the embodiment shown in FIG. 2, the sheet material 20 has a tongue-in-groove arrangement wherein when the sheet material 20 is bent about the monolith 18, the tongue 28 at one end of the sheet material 20 will fit into the groove 30 at the opposite end to complete the gas seal for which the intumescent layer is employed when the housing 12 is closed around the monolith.

Where higher temperatures are encountered, such as in higher GVW vehicles or trucks, it may be desirable to increase the thickness of the intumescent layer 22 or to include an additional layer of, e.g., ceramic fiber 26 which can be placed against the monolith 18. This is desirable where the intended monolith operating temperatures are up to 2000° F. or higher. The ceramic fiber layer 26 could have an installed nominal thickness of at least 0.03 inch and an installed nominal density of at least about 40 pcf. Preferably, the intumescent layer 22 has an installed (compressed) nominal thickness of at least about 0.2 inches and an installed nominal density of about 70 pcf, and layer 26 is in the form of ceramic fiber paper. However, other ceramic fiber forms such as blanket, mat or felt may be employed, provided they impart the necessary thermal insulation and mechanical support as provided by a layer of ceramic fiber paper.

While in FIGS. 1 and 3 the intumescent material is shown to be provided in the form of a single layer 22, plural layers of intumescent material may be employed if the requisite thickness and density cannot be achieved by a single layer process. The ceramic fiber paper may be laminated to the intumescent layer prior to assembly in a catalytic device. In the case of truck catalytic converters, the intumescent layer is desirably thick, thus being resistant to bending and susceptible to cracking.

The thicker the intumescent layer, the more susceptible the layer is to cracking and to loss of vermiculite flakes. This condition can be even more severe if a ceramic fiber layer is used to provide a thicker layer. The present invention facilitates installation of the sheet material by preventing cracking of sheet material 22 and loss of vermiculite flakes and restraining the sheet material so that when housing 12 is closed, the sheet material will not extrude or flow into opening 14 formed by flanges 16 which hold the housing 12 together. Thus, speeding up the installation operation.

The intumescent sheet material may be produced from unexpanded vermiculite, hydrobiotite, or water-swelling tetrasilicic fluorine mica using organic and/or inorganic binders to provide a desirable degree of wet strength. The sheet material can be produced by standard paper making techniques as described, for example, in U.S. Pat. No. 3,458,329, the disclosure of which is incorporated herein by reference, to produce a desirable thickness from about 0.1 to about 25 mm.

While there is no criticality in the composition of the reinforcing layer or the adhesive material, it is important that the reinforcing layer should have a tensile strength greater than that of the intumescent layer and the adhesive material should have some flexibility and maintain the reinforcing layer in contact with the intumescent layer. For that purpose, the reinforcing layer could be Kraft paper or plastic film or inorganic fiber fabric, and could have a thickness of up to 7 mils (i.e. 0.007 inch). A preferred reinforcing layer is polypropylene and a preferred thickness is up to about 5 mils. The adhesive material could be organic or inorganic, with acrylic pressure sensitive adhesive being preferred. Further, the reinforcing layer can be applied as a precoated adhesive sheet or by any coating techniques which produces an adhesively bonded reinforcing layer.

The intumescent sheet material is utilized in automobile exhaust catalytic converters as a mounting material by expansion in situ. The expanded sheet then holds the ceramic core or catalyst support in place in the container or canister. The thermal stability and resilience of the sheet after exfoliation compensate for the difference in thermal expansion of the metal canister and the ceramic substrate, for vibration transmitted to the fragile device and for irregularities in the metallic or ceramic surfaces. The mounting material is found to be superior not only in that it is inexpensive and simple to use, but also it effectively solves the problems associated with thermal and mechanical shock inherent in such devices. By preforming the intumescent sheet material and subsequently bonding a reinforcing layer in accordance with the present invention, the resulting intumescent sheet material will provide for a uniform installation and provide uniform pressure on the monolith. Therefore, it is important that its installation be as simple as possible and not generate problems in and of itself.

An eminently suitable material for monolith temperatures up to 230° F. for ceramic fiber layer 20 has been found to be Fiberfrax ® 970 paper available from The Carborundum Company, Niagara Falls, N.Y. This product is made from bulk alumino-silicate glassy fiber having approximately 50—50 alumina/silica and a 70/30 fiber/shot ratio. About 93 weight percent of this paper product is ceramic fiber/shot, the remaining 7 percent being in the form of an organic latex binder. For even higher monolith temperatures, papers produced from Fibermax TM polycrystalline mullite ceramic fibers available from this manufacturer may be employed. Alumina fibers may also be employed where high monolith temperatures are expected.

In a typical assembly intended for use with 2–10 ton trucks, the ceramic monolith is of round cross-sectional configuration and measures approximately 6 inches in diameter and has a length of about 3 inches. For the construction of a converter whose monolith is expected to operate at temperatures up to 2500° F., a layer of Fibermax TM ceramic fiber paper having a nominal uncompressed thickness of about 0.125 inch and a nominal uncompressed density of about 10 pcf is wrapped around each monolith. Thereafter, two layers of intumescent sheet material like that described in U.S. Pat. No. 4,916,057 or 4,305,992, each having a nominal uncompressed thickness of about 0.200 inch and a nominal uncompressed density of 40 pcf, are wrapped around the layer of ceramic fiber paper. This combination of monolith, ceramic fiber paper and intumescent sheet material layers is then inserted into one of the members corresponding to those which form housing 12. Thereafter, the assembly is installed by radially compressing between the members of the housing so that the combined thickness of the ceramic fiber paper and intumescent sheet material layers is reduced to about $\frac{1}{4}$ inch and the density of the combined layers is increased to about 70 pounds per cubic foot. Preferably, the ceramic fiber layer and intumescent layers extend longitudinally at least about 70 percent of the monolith length. Preferably, the ceramic fiber and intumescent layers do not extend beyond the length of the monolith. The metal housing extends beyond the ends of the monolith. After compression of the members forming the housing, their edges are either folded over as illustrated in FIG. 1 or welded longitudinally to form a gas-tight housing. By using a reinforcing layer such as has been disclosed herein, the intumescent sheet material was prevented from cracking and the housing was easier to close since there were no vermiculite flakes or extrusions to contend with.

While a presently preferred embodiment of the invention has been illustrated and described, it will be apparent to those skilled in the art that modifications thereof are within the spirit and scope of the invention. The monolith could be made from a metal composition, instead of ceramic, or it could be made from some other fragile material requiring support to avoid crushing, cracking, vibration stress and/or wear. Further, for example, the monolith may be an electrically resistant-heated element. The monolith may serve as a regenerable particulate trap, e.g., for use with diesel engines. For example, in assemblies where even higher monolith operating temperatures are anticipated, e.g. 2500° F., the ceramic fiber paper layer which is in contact with the monolith should be formed, for example, of Fibermax TM polycrystalline mullite fibers or of alumina fibers to thermally insulate the radially outer layers of vermiculite-containing intumescent material from exceeding their maximum continuous use temperature. The ceramic monolith may be first wrapped in polycrystalline alumino-silicate fiber, then wrapped with vitreous alumino-silicate fiber and then wrapped with intumescent material. The outside temperature of the housing of the catalytic converter may be reduced by increasing the thickness of the combined ceramic fiber and intumescent material layers. For simplicity of illustration, housing 12 has been shown to be smooth. In most applications, however, it is recommended that the housing be ribbed or otherwise reinforced to stiffen it to resist the force exerted by the compressed ceramic fiber paper and intumescent sheet materials.

"Ceramic fibers" as used herein include those formed from basalt, industrial smelting slags, alumina, zirconia, alumino-silicates and chrome, zircon and calcium modified alumino-silicates and the like.

I claim:

1. A preformed, handleable, flexible crack resistant intumescent sheet material for use in mounting fragile structures comprising:
   (A) a preformed intumescent layer, and
   (B) a reinforcing layer selected from the group consisting of kraft paper, plastic film and inorganic fiber fabric, bonded to said intumescent layer by an adhesive which is flexible and has a bond strength greater than the shear forces from bending said material, and having a tensile strength greater than said intumescent layer.

2. The material of claim 1 wherein said reinforcing layer has a substantially uniform thickness of up to about 3 mils.

3. The material of claim 1 wherein said material has a composite thickness of about 0.1 to about 5 inches.

4. The material of claim 1 wherein said reinforcing layer is polypropylene.

5. The material of claim 1 wherein the adhesive is an acrylic adhesive.

6. The material of claim 1 further including a ceramic fiber layer for mounting in contact with a ceramic monolith.

7. The sheet material of claim 6 wherein said ceramic fiber layer is selected from the group consisting of ceramic fiber mat, ceramic fiber blanket, ceramic fiber felt and ceramic fiber paper.

8. The sheet material of claim 7 in which said ceramic fiber layer is adjacent to the intumescent layer and is of a thickness sufficient to limit the maximum temperature of the intumescent layer to less than 1850° F. when a monolith mounted in contact with said sheet material is at tis intended maximum continuous operating temperature.

9. The sheet material of claim 8 wherein the ceramic fiber layer has an installed nominal thickness of at least 0.035 inches and an installed nominal density of at least 40 pounds per cubic feet.

10. Device for treatment of exhaust gases from an internal combustion engine comprising:
   (A) a housing having an inlet at one end and an outlet at an opposite end through which exhaust gases flow;
   (B) a frangible ceramic monolith resiliently mounted within said housing, said monolith having an outer surface and an inlet end face at said one end in communication with said inlet of said housing and an outlet end face at said opposite end in communication with said outlet of said housing; and
   (C) an intumescent sheet material, in contact with and covering at least a portion of said outer surface of said monolith, comprising:
      (a) an intumescent layer adjacent to and bonded to a ceramic fiber layer, and
      (b) a reinforcing layer selected from the group consisting of kraft paper, plastic film and inorganic fiber fabric bonded to said intumescent layer by an adhesive which is flexible and has a bond strength greater than the shear forces from bending said material and having a tensile strength greater than that of said intumescent layer.

11. A catalytic converter for purifying exhaust gases of an internal combustion engine comprising:
   (A) a hollow metallic housing having an inner surface and inlet at one end and an outlet at an other end;
   (B) a frangible gas-pervious ceramic monolith catalyst element resiliently mounted within said housing, said catalyst element having an inlet end face in communication with said inlet of said housing and an outlet end face in communication with said outlet of said housing; and
   (C) means thermally insulating and resiliently mounting said catalyst element in spaced relationship from said housing comprising:
      (a) at least one layer of intumescent sheet material covering a ceramic fiber layer, and
      (b) a reinforcing layer selected from the group consisting of kraft paper, plastic film and inorganic fiber fabric bonded to said intumescent layer by an adhesive which is flexible and has a bond strength greater than the shear forces from bending said material and having a tensile strength greater than that of said intumescent layer.

* * * * *